March 22, 1955   C. A. SHORT, JR., ET AL   2,704,436
JET NOZZLE ACTUATOR

Filed March 24, 1952   2 Sheets-Sheet 1

INVENTORS
Clair A. Short, Jr. &
Grover N. Conley
BY Willits, Helwig & Baillio
ATTORNEYS

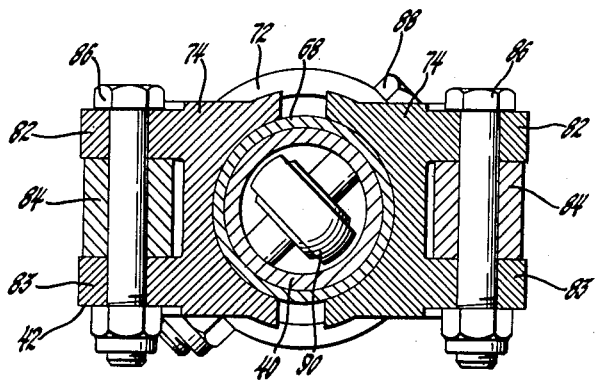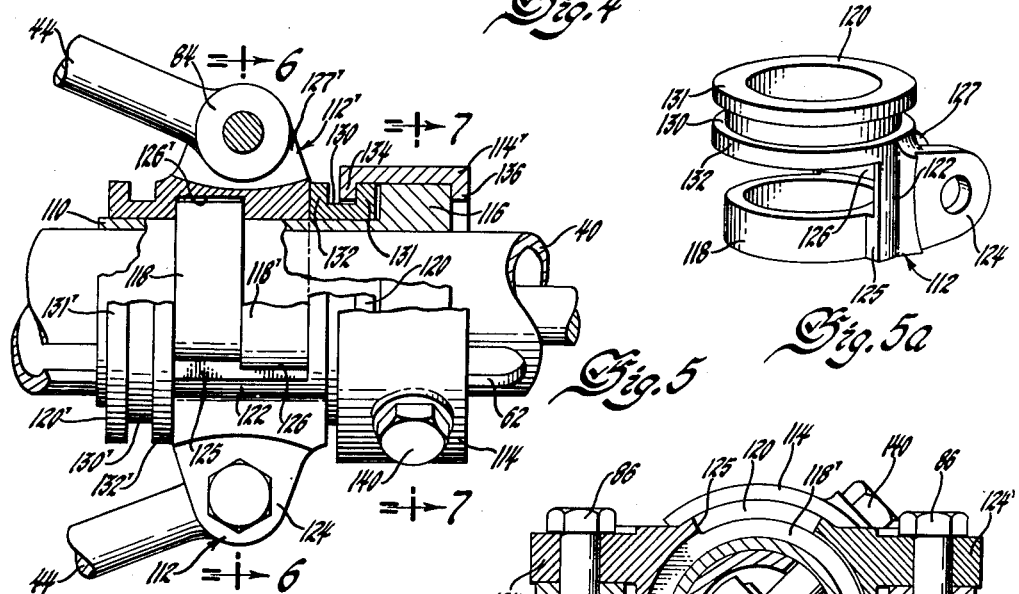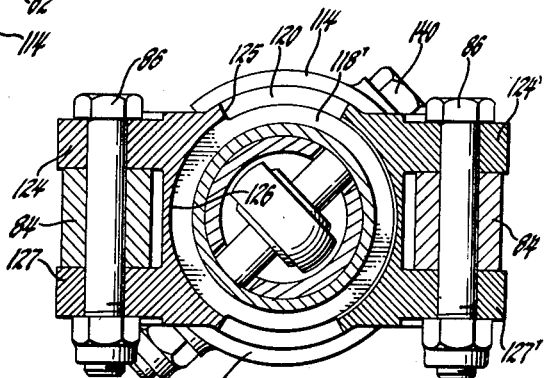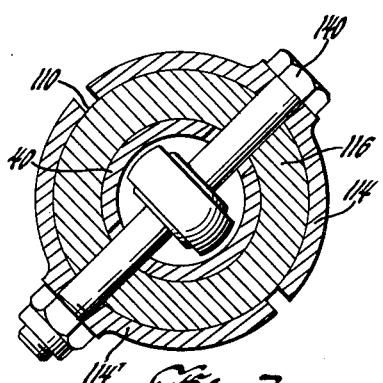

United States Patent Office 2,704,436
Patented Mar. 22, 1955

2,704,436

JET NOZZLE ACTUATOR

Clair A. Short, Jr., and Grover N. Conley, Indianapolis, Ind., assignors to General Motors Corporation, Detroit, Mich., a corporation of Delaware Application March 24, 1952, Serial No. 278,289

13 Claims. (Cl. 60—35.6)

This invention relates to variable area propulsion nozzles for use with jet propulsion engines and, more particularly, to operating mechanisms for actuation of variable area jet nozzle devices.

It has been generally recognized that the operating characteristics of jet propulsion engines may be improved by the provision of means for varying the area of the jet nozzle, and many structural arrangements for this purpose have been proposed, including nozzles of the adjustable valve or visor type wherein a pair of opposed visors are pivotally mounted on a diameter of a jet pipe to restrict or enlarge the area of the gas jet orifice. The power for moving the visors, also called the eyelids, may be supplied from a suitable actuator mounted on the jet pipe through an operating mechanism which may include a guided crosshead member driven by the actuator and coupled to the eyelids of the variable nozzle by connecting links.

The present invention is directed towards improvements in operating mechanisms of the above mentioned character and has for its immediate objective the provision of a self-adjusting crosshead that reduces friction of the elements of the operating mechanism due to cross loads which tend to twist the crosshead member. Other objects are to provide a simple, efficient and inexpensive jet nozzle operating mechanism that is rugged, light in weight, and smooth and reliable in operation.

Figure 1:
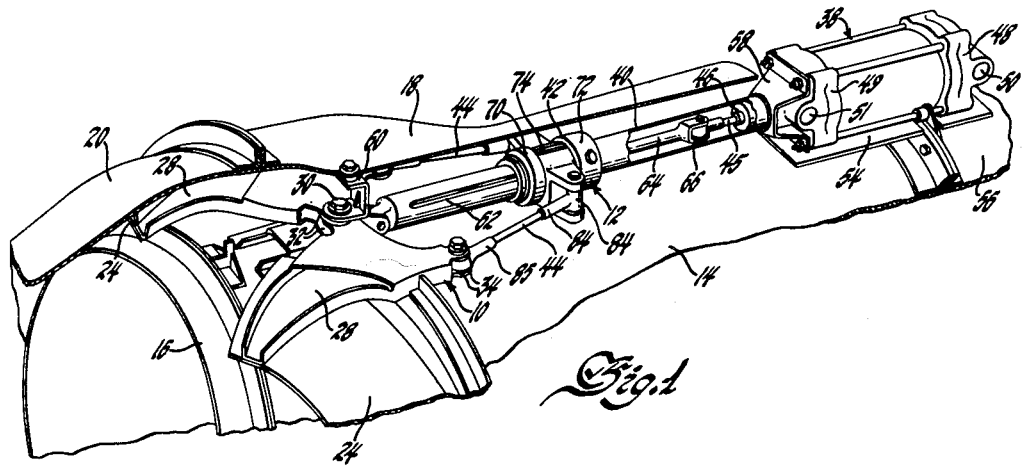
Figure 2:
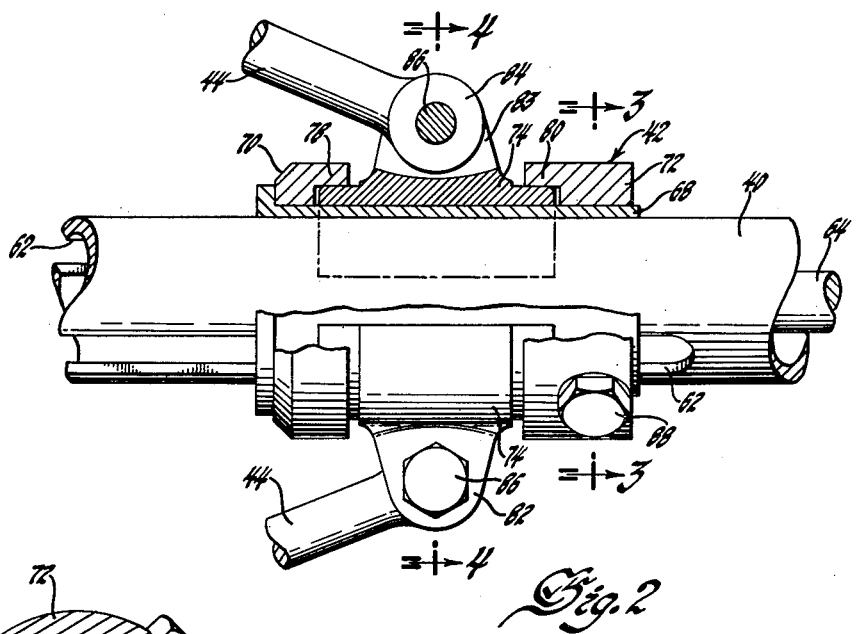
Figure 3:
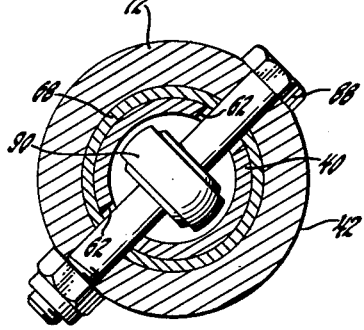

The above and other objects, together with the features and advantages attending the invention, will appear more fully from the following detailed description and drawings, wherein:

Fig. 1 is an axonometric view of a preferred form of operating mechanism in accordance with the invention for actuation of a variable area jet nozzle for a turbojet engine; Fig. 2 is a plan view, partly in section and with parts broken away, of a portion of the actuator mechanism of Fig. 1; Figs. 3 and 4 are transverse sectional views taken in the planes 3—3 and 4—4, respectively, of Fig. 2; Fig. 5 is a plan view, partly in section and with parts broken away, of a self-adjusting crosshead member in accordance with another embodiment of the invention; Fig. 5A is an axonometric view of a part of the self-adjusting crosshead member of Fig. 5; and Figs. 6 and 7 are transverse sectional views, taken in the planes 6—6 and 7—7, respectively, of Fig. 5.

Referring to the drawings, Fig. 1 illustrates a variable area jet nozzle 10 and an operating mechanism 12 in accordance with a preferred embodiment of the invention mounted on a jet pipe 14 which may be the tail pipe or an afterburner affixed to the tail pipe of a jet propulsion engine. The remainder of the engine is not illustrated because the structure of such engines is well known and the details thereof are immaterial to the invention.

The jet pipe 14 converges gradually in a rearward direction so that the wall thereof is inclined to the axis of the engine. The pipe terminates in a fixed converging outlet nozzle portion 16 and is surrounded by a forward shroud or heat shield 18 which is supported in spaced relation therefrom, and an annular after-shroud 20 which is fitted to the forward shroud.

The jet nozzle 10 is of the known adjustable valve or visor type and comprises a pair of opposed visor or eyelid members 24 each shaped in the form of a segment of a spherical zone and having a substantially triangular bracket 28 welded or otherwise secured to the ends thereof. The eyelids 24 are rotatably mounted on pivot arrangements, one of which is indicated at 30, extending through a pair of ears 32 formed in one corner of each of the eyelid brackets 28. A second set of ears 34 formed in another corner of each bracket forms a clevis for attachment thereto of one end of a connecting link which forms a part of the operating mechanism. The pivots, which extend from the wall of the tail pipe, are aligned with a diameter thereof and define an axis of rotation normal to the axis of the engine. The eyelids are shown in their open position in which the opening between them is a maximum, and may be swung inwardly about the pivots over the fixed nozzle 16 to restrict the jet nozzle orifice.

The operating mechanism 12 comprises a pair of actuating assemblies (only one of which is shown) mounted on opposite sides of the jet pipe 14. Each of the actuating assemblies comprises a motor 38, a tubular guide member 40, a sectional crosshead member 42, which is reciprocably mounted on the tubular guide member 40, and a pair of connecting links 44 connected between the crosshead and nozzle eyelids.

The actuator motor 38 is preferably of the cylinder and piston type, the piston rod 45 of which extends through a cylindrical boss 46 formed on the cylinder head 49. Ports 50 and 51 are provided in the forward and rear cylinder heads 48 and 49 for the purpose of supplying air or other fluid thereto to move the piston. The cylinder 38 is mounted on a heat shield 54 that is spaced and supported from the hot shell of the tail pipe 14 by side brackets 56 which permit relative longitudinal movement of the cylinder with differential thermal expansion of the jet pipe 14. The details of the cylinder mounting are immaterial to the present invention.

The tubular guide member 40 is preferably of circular section, and extends longitudinally of the jet pipe 14 and parallel to the wall thereof to provide a rigid nonextensible assembly of the cylinder 38 and guide member in line with the eyelid pivot 30 with which they are associated. The forward end of the guide member is piloted on the cylindrical boss 46 of the cylinder head 49 and is welded to a bracket 58 that is bolted to the cylinder head 49 as shown. The other end of the guide member is connected to a support bracket 60 which is a part of the support structure of the pivot 30. The details of this mounting are immaterial to the invention. The guide member 40 is formed with elongated slots 62 (shown inclined 45° to the axis of the guide 40) on both sides thereof to permit coupling of the connecting rod 64 of the air cylinder to the crosshead 42 as will appear hereinafter. The interior of the guide encloses the thrust member of the operating mechanism formed by the piston rod 45 which is flexibly connected to a connecting rod 64 through an eye and clevis joint 66.

As best shown in Figs. 2 to 4, the crosshead 42 is an assembly formed by a flanged sleeve 68 mounted on the exterior of the guide member 40, two spaced rings or collars 70 and 72 mounted on the sleeve 68, and a pair of identical shoes 74 extending between the spaced rings 70 and 72. Each of the spaced rings 70 and 72 has an integrally formed rim 78 and 80, respectively, extending therefrom that bears on the ends of the shoes 74 and serves to retain the latter on the sleeve 68. As shown in Fig. 4, the inner surface of each of the shoes is of arcuate form so as to permit rotary movement about the axis of the sleeve and guide member. Each of the shoes 74 has a pair of integrally formed spaced ears 82, 83 extending therefrom to provide a clevis for attachment of the connecting links 44 thereto. An eye fitting 84 provided at one end of each of the connecting links 44 is connected to a crosshead clevis by a bolt 86. An eye fitting 85 of the ball joint type is provided at the other end of each link 44 to connect to the ears 34 of the eyelids, as shown in Fig. 1. The elements of the sectional crosshead are retained on the sleeve 68 and the crosshead is connected to the thrust member of the operating mechanism by a transverse pin in the form of a bolt and nut 88 which extends through aligned openings in the ring 72 and sleeve 68, through the slots 62 in guide member 40 and through an eye fitting 90 of the ball joint type at the rear end of the connecting rod 64 of the operating mechanism as shown in Fig. 3.

It will be noted that the orientation of the operating mechanism and the nozzle eyelids is such that the crosshead 42 moves in a longitudinal direction inclined to the axis of the pipe 14 and that the connecting links 44 lie in planes at different angles to the axis of the guide 40 for each position of the crosshead and eyelids. The links 44 and shoes 74 rotate around the axis of the guide to accommodate themselves to this condition. Because of this, unbalanced loads due to unequal resistance to motion of the visors do not tend to twist the crosshead as a whole about the guide member 40 and cause binding of the parts of the operating mechanism as would otherwise occur. By reason of the sectional construction of the crosshead, the structure is self-adjusting, since the shoe members 74 thereof are adapted for relative rotary movement about the axis of the sleeve 68 and guide member 40 and relieve the crosshead of any twisting moments that would otherwise be exerted thereon. Rotary movement of the sleeve 68 and spaced ring members 78 and 80 of the crosshead is prevented or limited by the coaction of the elongated slot 62 with the transverse pin 88.

It is believed that the operation of the eyelid operating mechanism will be clear to those skilled in the art from the foregoing, but it may be described briefly. The cylinder 38 is coupled to a suitable source of air or other fluid under pressure which is supplied to either of the ports 50, 51 (Fig. 1) of the cylinder through a suitable valve (not shown). When air is supplied to the port 50, the crosshead 42 is moved rearwardly pushing on the links 44 to close the eyelids. To open the eyelids, air is supplied to the port 51, causing the crosshead 42 to move in a forward direction into the position shown.

The thrust of the cylinder is exerted through a circuit which includes the piston rod 45 in series with the connecting rod 64 and crosshead 42, from the crosshead through the links 44, the ears 34 of the eyelids 24 and then to the pivot 30. The circuit of the reaction forces extends from the pivot 30 and support post 60, the tubular guide member 40, and then to the cylinder head 49 of the air cylinder actuator 38. It is thus seen that the working and reaction forces are evenly distributed about the eyelid pivots and are confined within the structure of the operating mechanism. Since these forces are not distributed through the shell of the afterburner, buckling or warping thereof is not likely to occur.

Figs. 5, 6 and 7 illustrate a crosshead assembly in accordance with another embodiment of the invention that may be used with the operating mechanism of Fig. 1. The crosshead assembly shown in Fig. 5 comprises a flanged sleeve 110, a pair of identical forked or fingered members 112, 112' (Fig. 5A), and a pair of half-shell members 114, 114'. The sleeve 110 has a flange 116 at one end thereof and is mounted on the tubular guide member 40 for longitudinal movement thereon. The forked members 112, 112' are carried by the sleeve and are locked against relative longitudinal movement thereon. As best shown in Fig. 5A, each of the forked members of the crosshead assembly is an integral structure formed by two spaced ring sections 118 and 120 and an arcuate connecting section 122 therebetween having a pair of ears 124 and 127 (Fig. 6) extending therefrom so as to form a clevis for the ends 84 of the links 44 (Fig. 1) connected between the eyelids and the crosshead assembly.

Ring section 118 of the forked member 112 is chamfered as indicated at 125 so as to be of lesser external diameter than the ring section 120 and constitutes an annular tongue that is received in a complementary arcuate groove 126' contained in the opposite forked member 112' as shown in the upper left-hand portion of Fig. 5. The ring 118' of the upper forked member 112' of Fig. 5 is received in a similar annular groove 126 in the forked member 112 (as shown by the lower forked member 112). The annular groove 126 is contained in the inner surface of the arcuate connecting portion 122 between the spaced rings 118 and 120, the outline of the groove being shown by the curved line 126 in Fig. 6. The spaced rings 118 and 120 are aligned to permit the forked member constituted thereby to be mounted on the sleeve 110 which passes centrally therethrough after the two forked members have been mated together, as in Fig. 5.

An annular groove 130 is preferably formed in the surface of each of the ring sections 120 and 120' (although it is required in only one of them) so as to form a pair of spaced flanges 131 and 132 therein which permit coupling of the interfingered forked members to the sleeve member 110. The coupling is effected by the half-shell members 114 and 114', each of which has a channel-shaped cross section with inwardly extending flanges 134 and 136 at the ends thereof that lock with the flange 131 of the forked member 112 and the flanged end 116 of sleeve 110, respectively. The half-shells are secured to the sleeve member 110 and to the thrust member of the operating mechanism by a transverse pin formed by a bolt and nut 140 passing therethrough as shown in Fig. 7 in a manner similar to that described in connection with Fig. 3.

It will be noted that although the forked ring members 112, 112' are positively interlocked against relative longitudinal movement on sleeve member 110, they are free for relative rotary movement thereabout. Therefore, the crosshead structure is relieved from any twisting moments that may be exerted thereon during operation of the variable nozzle eyelids and smooth and reliable operation of the operating mechanism is obtained.

It is to be understood that the above described arrangements are but illustrative of the application of the principles of the invention and that numerous other arrangements may be devised by those skilled in the art without departing from the spirit and scope of the invention.

We claim:

1. In combination, operating means, movable means actuated by said operating means, and an actuating mechanism disposed between said operating and said movable means, said actuating mechanism comprising a guide member, a crosshead slidably mounted on said guide member, means for connecting said operating means to said crosshead to move the crosshead longitudinally of said guide member, said crosshead including means mounted thereon for relative rotary movement about the axis of said guide member, and means coupled between said movable means and said last mentioned means of said crosshead.

2. In combination, operating means, movable means actuated by said operating means and comprising at least one pair of cooperative members mounted for substantially simultaneous movement, and an actuating mechanism disposed between said operating and said movable means, said actuating mechanism comprising a guide member, a crosshead slidably mounted on said guide member, means for connecting said operating means to said crosshead to move the crosshead longitudinally of said guide member, said crosshead including two parts mounted thereon for relative rotary movement about the axis of said guide member, and means coupled between each of said cooperative movable members and each of said parts of said crosshead.

3. In combination, operating means, movable means actuated by said operating means and comprising at least one pair of cooperative members pivotally mounted for simultaneous movement, and an actuating mechanism disposed between said operating and said movable means, said actuating mechanism comprising a guide member, a crosshead slidably mounted on said guide member, means for connecting said operating means to said crosshead for movement thereof longitudinally of said guide member, said crosshead including a pair of arcuate members mounted thereon for relative rotary movement about the axis of said guide member, and means coupled between said movable means and said arcuate members of said crosshead.

4. In combination, operating means, movable means actuated by said operating means and comprising at least one pair of cooperative members pivotally mounted for simultaneous movement, and an actuating mechanism disposed between said operating and said movable means, said actuating mechanism comprising a guide member, a crosshead slidably mounted on said guide member, means for connecting said operating means to said crosshead for movement thereof longitudinally of said guide member, said crosshead including a pair of members locked against longitudinal movement relative to said crosshead and mounted for relative rotary movement about the axis of said guide member, and means coupled between said movable means and said rotatable members of said crosshead.

5. A crosshead structure comprising, in combination, a sleeve member having a flanged end, a pair of flanged rings mounted in spaced relation on said sleeve member, one of said flanged rings being mounted adjacent said flanged end of said sleeve member, means for securing the other of said rings to the other end of said sleeve member, and sectional means carried by said sleeve member mounted for relative rotary movement thereabout, said means comprising a pair of arcuate shoe members extending between said flanged rings.

6. A crosshead structure comprising, in combination, a sleeve member having a flanged end, a pair of ring members carried on said sleeve member and mounted for relative rotary movement about the axis thereof, each of said ring members having an annular tongue and slot formed therein, whereby said members may be positively interlocked against relative longitudinal movement only, one of said ring members having a flanged end integral therewith and adjacent said flanged end of said sleeve member, flanged collar means disposed about the flanged ends of said sleeve and said one ring member for coupling said sleeve and flanged ring members for longitudinal movement, and means for securing said sleeve member to said collar means.

7. In combination, a guide, a crosshead reciprocable thereon, two relatively rotatable parts mounted on said crosshead for rotation about a common axis parallel to the direction of and coinciding with the axis of reciprocation of said crosshead, and means locking the said parts to said crosshead for reciprocation therewith.

8. In combination, a guide, a crosshead reciprocable thereon, two parts mounted on said crosshead for rotation about a common axis parallel to the direction of reciprocation of said crosshead, and means locking the said parts to said crosshead for reciprocation therewith, said means including a pair of flanged rings mounted on said guide on opposite ends of said parts of said crosshead.

9. In combination, a cylindrical guide, a crosshead reciprocable thereon, two arcuate parts mounted on said crosshead for relative rotation about a common axis coinciding with the axis of said guide, and means locking the said parts to said crosshead for reciprocation therewith.

10. In combination, a cylindrical guide, a crosshead reciprocable thereon, two part-cylindrical shoes mounted on said crosshead for rotation about a common axis coinciding with the axis of said guide, and means locking the said shoes to said crosshead for reciprocation therewith, comprising flanged rings extending over the ends of said shoes.

11. In combination, a guide, a crosshead reciprocable thereon, two parts mounted on said crosshead for rotation about a common axis parallel to the direction of reciprocation of said crosshead, each said part comprising two rings and a portion joining the rings, the rings of the said parts being interleaved, and means connecting one of the said parts to the crosshead for reciprocation therewith.

12. In apparatus including a jet pipe terminating in an outlet nozzle, pivot means on said pipe defining an axis of rotation normal to the axis of and adjacent the nozzle end of the pipe, at least two adjustable visor members constituting a variable area nozzle mounted for rotation on said pivot means and actuating means including a reciprocable drive motor mounted on the pipe, thrust means driven longitudinally of said pipe by said motor, guide means extending longitudinally of said pipe from said pivot means for guiding said thrust means, a crosshead mounted for reciprocation on said guide means and means pivotally connecting said crosshead to said adjustable visor members; the combination with said actuating means wherein said crosshead comprises a pair of adjustable parts mounted for relative rotary movement on the axis of said guide means and means connecting said parts to said thrust members for reciprocation thereby.

13. A self-adjusting crosshead reciprocable on a cylindrical guide, said crosshead comprising, in combination, two interconnected arcuate forked parts mounted for relative rotation about a common axis coaxial with the axis of said guide and means retaining and locking the said parts against relative longitudinal movement on said guide.

References Cited in the file of this patent
UNITED STATES PATENTS

| | | |
|---|---|---|
| 519,239 | Church | May 1, 1894 |
| 634,650 | Palmiter | Oct. 10, 1899 |
| 1,997,884 | Melker | Apr. 16, 1935 |
| 2,523,842 | Oulianoff | Sept. 26, 1950 |
| 2,551,372 | Haltenberger | May 1, 1951 |